United States Patent [19]

Brandsema et al.

[11] Patent Number: 4,811,658

[45] Date of Patent: Mar. 14, 1989

[54] APPARATUS AND SYSTEM FOR DRAINING WHEY FROM CHEESE CURD FOR MANUFACTURING CHEESE

[75] Inventors: Wiebrand-Anno Brandsema, Valthermond; Boeli Kuipers, Ter Apel, both of Netherlands

[73] Assignee: Arend B.V., Heembadweg, Netherlands

[21] Appl. No.: 51,525

[22] Filed: May 19, 1987

[51] Int. Cl.[4] .................... A01J 25/00; A01J 25/12; A23C 19/00

[52] U.S. Cl. .................... 99/455; 99/458; 100/269 A; 100/278; 220/4 F

[58] Field of Search .................... 99/452-459, 99/460, 465; 220/1.5, 4 F; 206/508, 509; 100/211, 116, 278, 125, 221, 194, 269 A; 68/242, 241; 425/84, 85, 412; 249/81, 84, 118, 141

[56] References Cited

U.S. PATENT DOCUMENTS

| | | | |
|---|---|---|---|
| 2,942,983 | 6/1960 | Sadler et al. | 99/459 X |
| 3,209,680 | 10/1965 | McGinnis | 68/242 |
| 3,269,157 | 8/1966 | Ashley | 68/242 |
| 3,355,805 | 12/1967 | Krueger et al. | 99/458 |
| 3,838,955 | 10/1974 | Dubbeld | 99/458 X |
| 4,249,400 | 2/1981 | Arendt | 100/211 X |
| 4,456,142 | 6/1984 | Burling | 99/452 |
| 4,509,413 | 4/1985 | Granberg et al. | 99/459 X |
| 4,633,685 | 1/1987 | Mollerus | 100/211 X |

FOREIGN PATENT DOCUMENTS 7812311 7/1985 Switzerland .................... 99/452

*Primary Examiner*—Timothy F. Simone
*Attorney, Agent, or Firm*—Larson & Taylor

[57] ABSTRACT

Method and apparatus for draining whey from cheese curd and for manufacturing blocks of cheese. A mould of flat perforated wall panels, a perforated bottom plate and a perforated follower plate, all of plastic material, enclosed by metal hoops is filled with cheese curd. A perforated follower plate is placed on top of the cheese curd, on which an increasing pressing force is exerted. The mould is cooled during at least part of the time period of increasing pressure.

6 Claims, 4 Drawing Sheets

APPARATUS AND SYSTEM FOR DRAINING WHEY FROM CHEESE CURD FOR MANUFACTURING CHEESE

The invention relates to a method for draining whey from cheese curd for manufacturing blocks of cheese.

More specifically the invention relates to manufacturing rectangular cheese blocks possibly of large size such as 640 lbs blocks.

Such methods, apparatus and systems have been depicted in U.S. Pat. No. 4,234,615 to Krueger, U.S. Pat. No. 4,263,330 to Streeter et al and U.S. Pat. No. 4,492,153 to Grabowski.

A major problem occurring with these known methods is the obtention of a cheese block having the same moisture content all over the block. With the known method the mould is provided with a whey permeable bottom and follower plate. Further one or more additional perforated drain screen means, blades or posts, are inserted in the curd and retracted after a whey removal step. Apart from the disadvantage of the additional steps of applying and retracting this drain screen means the cheese never completely closes its wound at the location where the drain screen means was retracted. Further the moisture distribution still can be improved, it being difficult to obtain a reasonable constant moisture content, specially near the side walls and the corners.

A further difficulty is the cheese surface of the blocks. Normally a closed surface is difficult to obtain because small whey or gas globules present at the surface will stay there and disturb the smoothness of the surface. If cheese has to be stored a closed surface always is an advantage though most of the protection is obtained by means of some type of foil or film.

With the known method it is often desired to tilt the mould for better draining.

It is an aim of the invention to reduce the number of steps and to improve the homogenity of the drain.

This aim is realized in accordance with the invention with a method for draining whey from cheese curd for manufacturing blocks of cheese comprising the steps of
 (a) providing a pressing container mould having a perforated bottom of plastic material and perforated side walls of plastic material enclosed by metal hoops,
 (b) filling said mould with cheese curd containing whey,
 (c) applying a perforated follower plate,
 (d) exerting an increasing pressing force on said follower plate, and
 (e) cooling said mould at least during part of the time period in which said increasing pressure is applied.

It is known in practice to let whey leach out of the curd particles before applying any pressure. If desired this can be done also when applying the invention.

Further some vacuum treatment can be used for instance for degassing the curd. Such a treatment is common for the manufacture of what is called Cheddar cheese, though the original cheddar is not quite the same. Such a vacuum treatment can be used also when applying the invention. With for instance Kruger the vacuum is applied during part of the pressing period, with the invention it is also possible to let is occur in an earlier stadium.

Pressing normally is first carried out in the cheese plant at a rather high pressure. After this the mould is brought under resilient pressure means such as an air cushion or springs to let the cheese cure and cool. Normally the pressure exerted by the cushion or the springs in the curing period is smaller then with the pressing in the plant. Though in this stadium the volume decrease of the cheese and consequently the distance travelled by the follower plate is small, some relaxation will occur and certainly no pressure increase.

A further important insight on which the invention is based is that starting with a small pressure and in the course of time increasing it results in better whey removal. The reason hereof is that with higher pressure the curd or cheese is closed or made less permeable to the whey. A stepwise or gradual increase of pressure is favourable for a quick whey removal, which in combination with the all-sided whey exit through all mould walls yields a very homogeneous cheese. It is thought that because of the heat resistance of the grooved surface of the mould a less sudden chilling of the skin of the curd occurs, which is favourable for the whey extraction.

A further point to be considered is that due to syneresis the permeability of curd or cheese is better with higher temperature inside the allowed temperature range. On the other hand it is desirable to cool the curd or cheese as soon as possible, because infection or going bad sooner occurs with higher temperatures. The quick whey removal due to a pressure increasing from a rather low start value allows for sooner cooling.

A very attractive embodiment of the invention provides that steps (d) and (e) are carried out by a fluid pressure responsive force generator the fluid pressure of which is controlled when said mould is placed in a cooling chamber.

This embodiment can be realized by mounting a cushion or cylinder on the follower plate, driving the mould into a cooling chamber and connecting the cushion or cylinder to a connecting member for pressurized air, the pressure of which is controlled in accordance with a predetermined time schedule.

Curing and cooling may last a considerable time, for instance several days or even weeks. It is not necessary to increase the pressure all this time and it is possible to lower the pressure again after a period of gradual or stepwise pressure increase. The time period from applying the relatively low starting pressure to releasing the highest pressure depends on the speed of whey retraction and may last from several hours to a day. It is, however, normally over an hour.

It is remarked that when applying the invention, curd may be made in the same way as with known methods. It can be divided in small cubes and salted, which normally happens with Cheddar cheese, but it can also be milled or cut into pieces as nowadays is usual.

The moulds used with the known techniques have a vertical sheath of impervious material with a pervious bottom and follower plate provided with perforated whey retraction members. In U.S. Pat. No. 4,263,330 to Streeter, already cited, bands are used around the mould to keep its walls together. From practice it is known to reinforce the mould by providing hoops around such a sheath. These hoops can be made of stainless steel. In several cases the cheese is sold in its mould and the parts of the moulds have than to be returned. In order to occupy therewith as less space as possible, the sheath is preferably carried out in panels and the hoops in parts to be connected to each other.

With such a construction it is important to maintain a rectangular shape because when cutting the block all irregularities such as bilging surfaces or oblique angles will cause waste.

If the hoops are made of straight bars or profiles connected to each other at the corners of the sheath the possibility exists that the shape will deviate from rectangular and become a diamond or parallellogram if the angles are not stiff enough. Further a rod of a certain stiffness will bilge more when its ends are free than in case the ends are clamped, for instance by reason of a rigid connection with an adjacent rod.

The invention provides a solution which on the one hand needs less volume in disassembled condition than would be necessary with integral hoops and on the other hand provides stiffer corners and less bilging of the straight parts of the hoops than would occur with rods of the same rigidity connected to each other at their ends.

The inventive solution consists in that said hoops consist of L-shaped members connected to each other at a location near the point where the bending moment due to the force exerted by said walls on the hoops is zero. Because the L-shaped members are connected to each other at the location in which the bending moment is zero the connection between the members need not to be rigid.

A preferred embodiment of this connection consists in that the L-shaped members are connected to each other by U-shaped clips, each leg of said U being inserted into a hole in an end part of the one and the other L-shaped member.

The invention is in the following elucidated on hand of the drawing, in which

Figure 1:
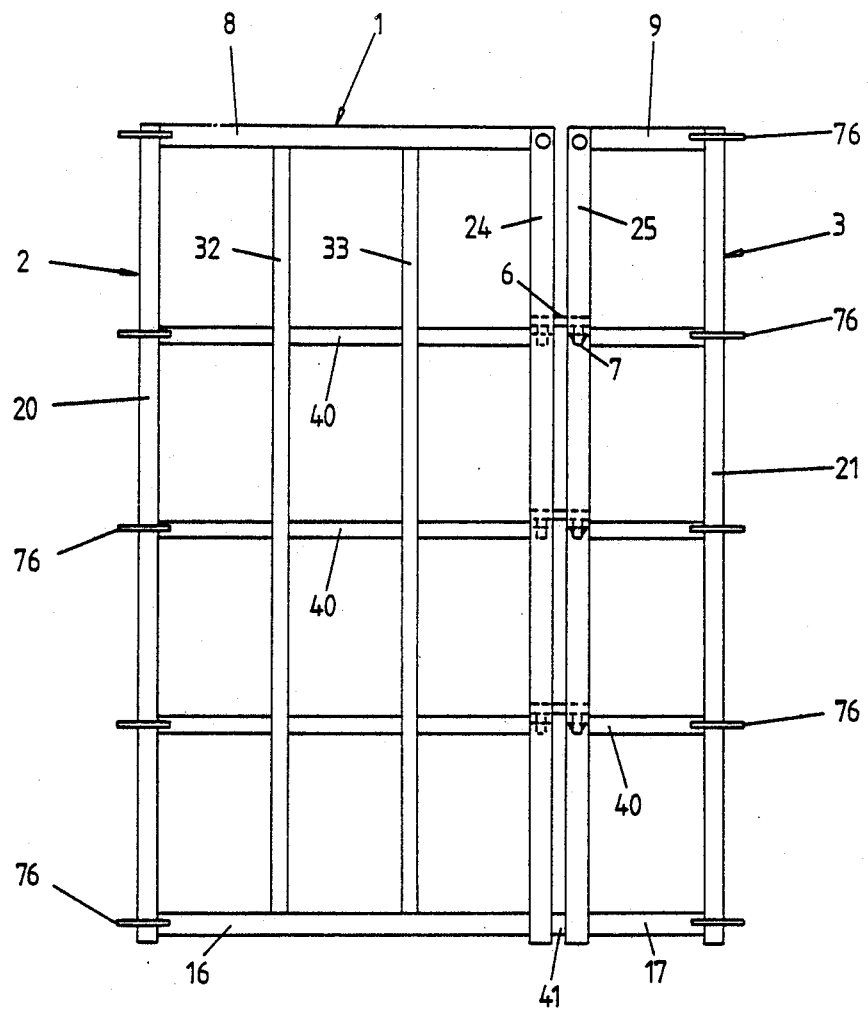
FIG. 1 shows a cart with a mould frame to be placed on it in side view.
Figure 1:
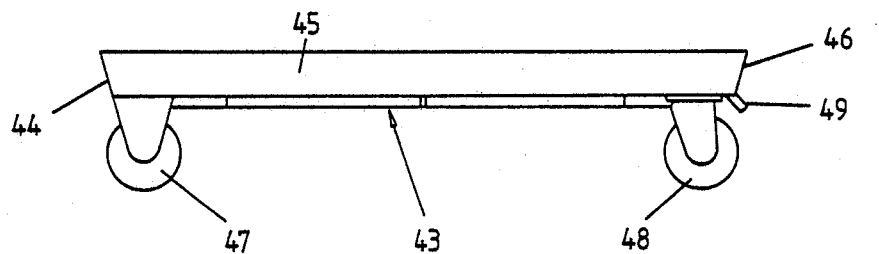

FIG. 1 shows a mould frame 1 consisting of four L-shaped members 2-5 (vide also FIG. 2) connected with each other by means of downward directed U-shaped clips 6 of which one leg 7 is fixedly connected to one of two L-shaped members to be connected to each other. Preferably said legs 7 are welded to the smallest L-shaped members.

The L-shaped members 2-5 consist of horizontal top beams 8-15 and bottom beams 16-19 with vertical corner beams 20-23 and end beams 24-31. Between corner beams 20-23 and the end beams 24,26,28,30 respectively vertical beams 32-39 have been mounted. Between all vertical beams of one L-shaped member horizontal cross beams 40 have been mounted. The corners of the L-shaped members are stiffened by means of plates 76 welded to the outside thereof. The mould frame 1 has a bottom 41, fitting exactly between said L-shaped members and is supported by them.

The bottom 41 consists of four outer beams forming a rectangle with a cross beam 42 connecting the mid-points of the smallest sides of the rectangle and running parallel to the largest sides of it. Perpendicular to this direction smaller cross beams have been fitted between the cross beam 42 and the two largest outer beams of the rectangle.

Further in FIG. 1 a cart 43 is shown for supporting and transporting the mould frame 1 during the manufacturing period, having inclined side walls 44-46, fixed front wheels 47 and pivotable rear wheels 48. An outlet 49 is mounted for the drainage of whey from the cart 43.

Figure 2:
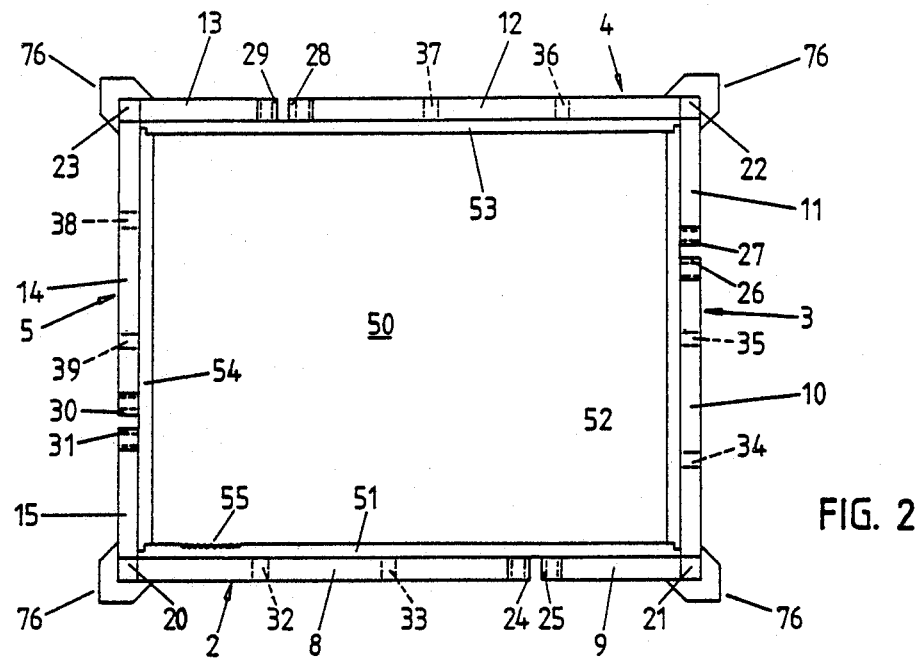
FIG. 2 shows a plan view of the mould with the follower plate and air cushion removed.

FIG. 2 shows a plan view of the mould frame 1 with a bottom plate 50 and four side panels 51-54 of perforated and grooved plastic material, with the grooves 55 in the side panels running in the shown embodiment in a vertical direction. With the perforations and grooves 55 an excellent whey drainage is obtained, drain screen means not being necessary.

The four side panels 51-54 have complementary stepwise vertical edges as shown, the bottom plate 50 fitting exactly between the side panels.

Figure 3:
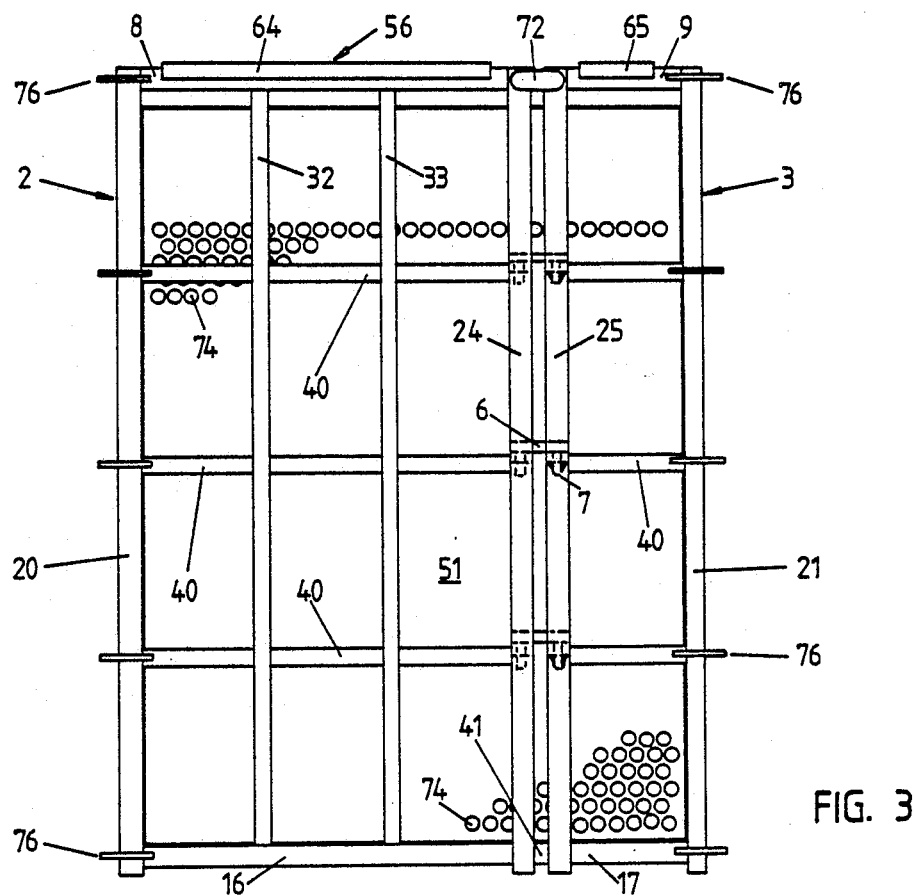
FIG. 3 shows a side view of the mould with cover.

FIG. 3 shows a side view of the mould frame 1 with the side panels 51-54 and cover plate 56. The cover 56 consists (vide FIG. 4) of four beams 57-60 forming a rectangle, a cross beam 61 parallel to the largest side of the rectangle and connecting the mid-points of the smaller sides 58,60 and smaller cross beams as shown. A plate 62 is connected to the beams. The inflatable cushion 63 is fixedly connected to the plate 62.

The cover 56 fits inside the four L-shaped members 2-5 and has channel beams 64-71 fixed to it, overlying the tops of the vertical beams 8-15 of the L-shaped members 2-5.

The cover 56 is further connected to the four L-shaped members 2-5 by means of U-shaped clips 72 with horizontal legs projecting through holes in the beams 8-15 of the L-shaped members 2-5 and beams 57-60 of the cover 56, the clips 72 being secured with hairpin springs 73. In this manner the clips 72 also provide an extra connection between the L-shaped members 2-5.

The small perforations in the side panels 51-54 open into far greater pot holes 74 made from the outside in the side panels of plastic material. These holes 74 lack at the uppermost part of the side panels, because the uppermost space of the mould, after filling the mould with curd and initial drainage, is occupied by the inflatable cushion 63 and follower plate 75.

Figure 4:
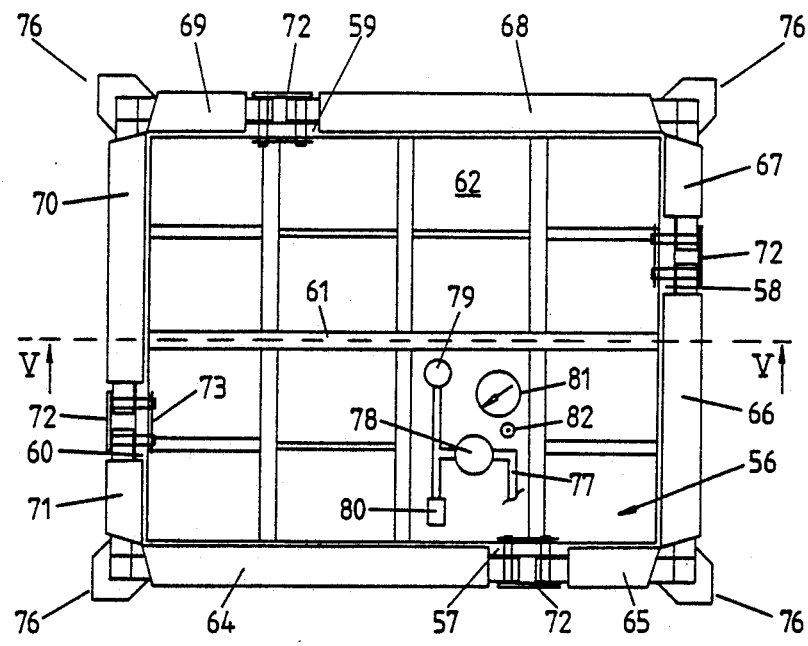
FIG. 4 shows a plan view of the mould with cover.

FIG. 4 shows a plan view of the mould frame 1 with the cover 56, U-clips 72, hairpin springs 73 and stiffening plates 76. On top of said cover 56 a supply line 77, for compressed air, a reducing valve 78, an inlet 79 to the inflatable cushion 63, an excess pressure valve 80, a reading device 81 and a discharge valve 82 are mounted to control and adjust the pressure exerted by the inflatable cushion 63 on the curd during various stages in the cheese manufacturing process.

Because the reducing valve 78 is a one-way valve, it is possible to transport the mould 1 on cart 43, while the pressure is maintained, for example to a cooling chamber. In case the pressure exerted on the curd has to be increased during the curing period in the cooling chamber, it may be preferable to connect the inlet 79 immediately to a controlled pressure source in the cooling chamber.

Figure 5:
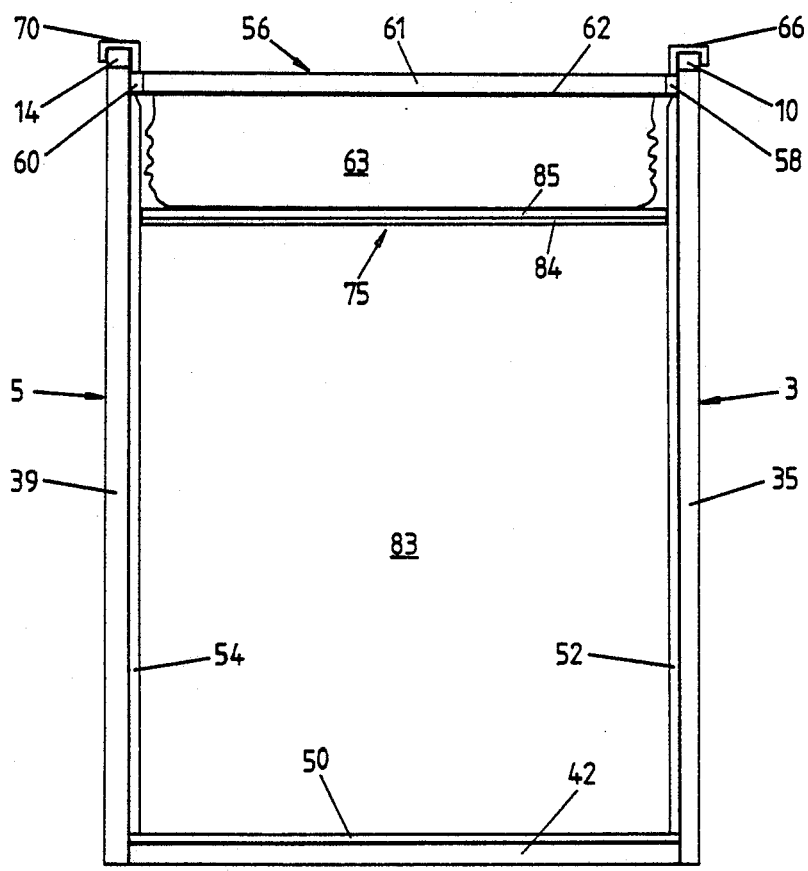
FIG. 5 shows a cross-section of the mould over line V—V in FIG. 4.

FIG. 5 shows a cross-section of the cheese mould 1 over line V—V in FIG. 4. The mould 1 is filled with curd 83 on top whereof the follower plate 75, the inflatable cushion 63 and cover 56 are mounted. The follower 75 fits precisely between the perforated side panels 51-54 and consists of two plates 84 and 85, one of which 84 being in direct contact with the curd 83. This plate 84 is perforated and has grooves on both sides. The second plate 85 is thicker than the lower plate 84 and has no perforations or grooves. This construction of the follower plate 75 enables whey drainage from top of the curd mass 83 through the perforations of plate 84 to the grooves between plates 84,85 out of the cheese mould 1.

Figure 6:
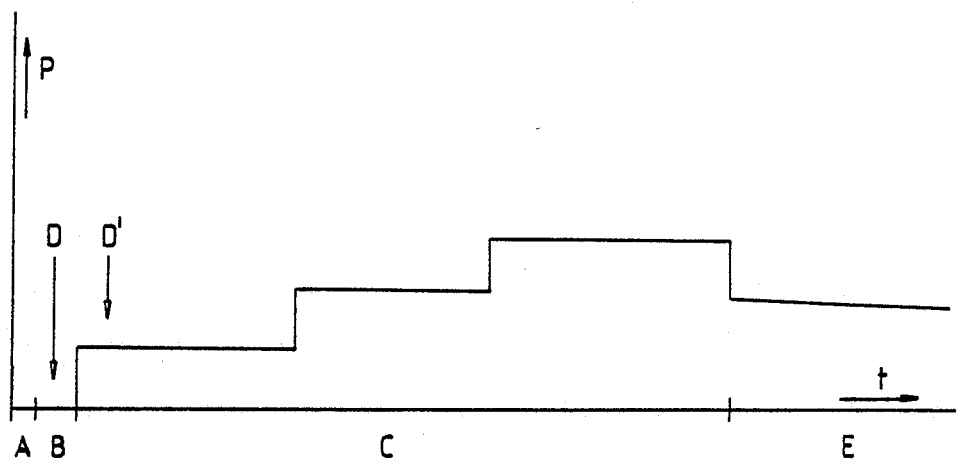
FIG. 6 shows a time chart of a method in accordance with the invention.

FIG. 6 shows a time chart of a method for cheese manufacturing according the invention.

At stage A the mould is filled with curd. Stage B represents initial whey drainage without applying any pressure; at the end of this stage the follower plate 75 and the inflatable cushion 63 with cover 56 are mounted. At the beginning of stage C pressure is applied to the curd mass 83. The pressure is increased stepwise as to obtain the best whey drainage possible.

After the pressing step has been completed at the end of stage C, the cheese mould 1 is stored at a lower pressure.

If no pressure control is applied during the several stages a small pressure drop may occur in every stage, due to volume decrease of the curd 83 and/or lowering of temperature. During part of the pressing and during the storing of the cheese, the mould is cooled. Cooling starts at point $D^1$.

It is also possible to start cooling even before applying pressure, point D in the time chart.

With certain cheese types, for instance Cheddar cheese, the cheese mould is placed in a vacuum chamber to remove gas bubbles present in the curd. During the stay in the vacuum chamber a very slight mechanical pressure is applied to the curd. In the time chart of FIG. 6 the vacuum treatment will be during stage B, cooling of the cheese mould starting after release of the vacuum.

After completion of stage C of increasing pressure, the cheese mould 1 is kept at stage E at a lower pressure, which may decrease slowly.

What is claimed is:

1. Apparatus for manufacturing cheese, having a mold comprising separate flat, perforated wall plates, a perforated bottom plate and a perforated follower plate, all of said plates being of a plastic material, an inflatable cushion of substantially the same area as said perforated follower plate, said cushion being mounted to exert a downward force to said follower plate, and a separate frame located on the outside of said wall plates adjacent to at least the upper and lower edges of said wall plates, said frame being arranged to engage said wall plates and to keep them relatively stationary with respect to each other.

2. Apparatus in accordance with claim 1, in which said frame comprises at least an upper and lower rectangular hoop and said hoops are provided with stiffening members at their corners.

3. A system for manufacturing cheese wherein the apparatus defined in claim 1 is enclosed in a cooling chamber and said inflatable cushion is connected to means for varying gas pressure to said inflatable cushion.

4. Apparatus according to claim 2, in which said hoops consist of L-shaped members connected to each other at a location near the point where the bending moment due to the force exerted by said walls on the hoops is zero.

5. Apparatus in accordance with claim 4, in which the L-shaped members are connected to each other by U-shaped clips, one leg of said U being inserted into a hole in an end part of an L-shaped member.

6. Apparatus in accordance with claim 4, in which a plurality of L-shaped members are connected to each other by upright bars, the thus formed combined L-shaped members having at their upper and lower sides a shape allowing a pile-up fit for moulds placed on each other.

* * * * *